United States Patent

Jacob et al.

[11] Patent Number: 6,031,628
[45] Date of Patent: Feb. 29, 2000

[54] POSTSCRIPT LEVEL 1 COLOR CORRECTION

[75] Inventors: Steve A. Jacob; Terry A. Smith, both of Boise, Id.

[73] Assignee: Hewlett-Packard Company, Palo Alto, Calif.

[21] Appl. No.: 08/997,514

[22] Filed: Dec. 19, 1997

[51] Int. Cl.[7] .............................. B41B 15/00; H04N 1/46; G03F 3/08

[52] U.S. Cl. ........................ 358/1.9; 358/1.9; 358/500; 358/518; 358/520; 345/150

[58] Field of Search ............... 395/109; 358/500, 358/518, 520, 1.9; 345/150

[56] References Cited

U.S. PATENT DOCUMENTS

5,243,414  9/1993  Dalrymple et al. .................... 358/500
5,311,212  5/1994  Beretta ............................ 345/150

*Primary Examiner*—Edward L. Coles
*Assistant Examiner*—Twyler Lamb

[57] ABSTRACT

A PostScript-compatible printer accepts PostScript language commands that indicate both device-dependent and device-independent color specifications. Such a printer in accordance with the invention has a PostScript interpreter that implements Level 1 and Level 2 color rendering pipelines. In the Level 1 color rendering pipeline, the interpreter converts device-dependent color specifications to internal color specifications using a calibrated n-dimensional operation. In the Level 2 color rendering pipeline, the interpreter converts device-independent color specifications to device-dependent color specifications using a standard PostScript color rendering dictionary, and then passes such device-dependent color specifications into the Level 1 pipeline for further processing.

19 Claims, 4 Drawing Sheets

POSTSCRIPT LEVEL 1 COLOR CORRECTION

TECHNICAL FIELD

This invention relates to printers that are compatible with PostScript language programming, and to PostScript graphics language interpreters that are used within such printers.

BACKGROUND

The PostScript graphics language is a simple interpretive programming language with powerful graphics capabilities. Its primary application is to describe the appearance of text, graphical shapes, and sampled images on printed or displayed pages. A program in this language can communicate a description of a document from a composition system to a printing system or control the appearance of text and graphics on a display. The description is high level and device independent.

PostScript is a trademark of Adobe Systems Incorporated. However, the PostScript trademark is used in conjunction with a widely used and well defined standard. Adobe Systems has authored a book entitled *PostScript Language Reference Manual: Second Edition,* published by Addison Wesley, 1990, which sets forth the current PostScript language standard. This book is hereby incorporated by reference. Although standards such as the Postscript language standard tend to evolve new features, Adobe Systems has endeavored to limit such evolution to well-publicized "levels," and to ensure that new levels are upwardly compatible with previous levels.

The PostScript language includes powerful facilities for describing the colors of graphical objects to be marked on the current page. The color facilities are divided into two parts:

Color specification. A PostScript language program can specify abstract colors in a device independent way. Colors can be described in any of a variety of color systems or color spaces. Some color spaces are related to a device color representation (gray scale, RGB, and CMYK); others are related to human visual perception (CIE-based). Certain special features are also modeled as color spaces: patterns, separations, and color mapping.

Color rendering. The PostScript interpreter reproduces colors on a raster output device by a multi-step process that includes color conversions, gamma correction, halftoning, and scan conversion. Certain aspects of this process are under PostScript language control. However, unlike the facilities for color specification, the color rendering facilities are device dependent and ordinarily should not be modified by a PostScript program.

Colors are specified as values having one or more color components. A color component is usually a number. For example, a gray value can be specified by a single number, ranging from 0 (black) to 1 (white). A full color can be specified in any of several ways. A common method uses three numbers to specify red, green, and blue components.

Color values are interpreted according to the current color space. There are three categories of color spaces:

Device color spaces collectively refer to several methods for directly specifying colors or gray levels that the output device is to produce. These methods include RGB (red-green-blue), HSB (hue-saturation-brightness), and CMYK (cyan-magenta-yellow-black).

CIE (the Commission Internationale de I'Eclairage) has created an international standard for color specification. Colors can be specified in the CIE-based color spaces in a way that is independent of the characteristics of any particular output device. One CIE color space uses parameters designated as X, Y, and Z.

Special color spaces add special semantics to an underlying color space. They include facilities for patterns, color mapping, and separations. Since the invention does not involve special color spaces, they will not be included in the following discussions and will not be shown in the accompanying drawings.

Color spaces, including specific examples of the color spaces implemented in the current PostScript standard, are explained in more detail in the *PostScript Language Reference Manual* cited above. Generally, the device color spaces enable the specification of color values that are directly related to their representation on an output device. The color values map directly—or via simple conversions—to the application of device colorants such as quantities of ink or intensities of display phosphors. CIE-based color spaces, on the other hand, allow the specification of color values that are related to human visual perception. The goal of the CIE standard is for a given CIE-based color specification to produce consistent results on different output devices, up to the limitations of each device.

For clarity in the following discussion, device color spaces and color values specified in device color spaces are referred to as device-dependent color spaces and device-dependent color specifications. CIE-based color spaces and color values specified in CIE-based color spaces are referred to as device-independent color spaces and device-independent color specifications, respectively.

Figure 1:
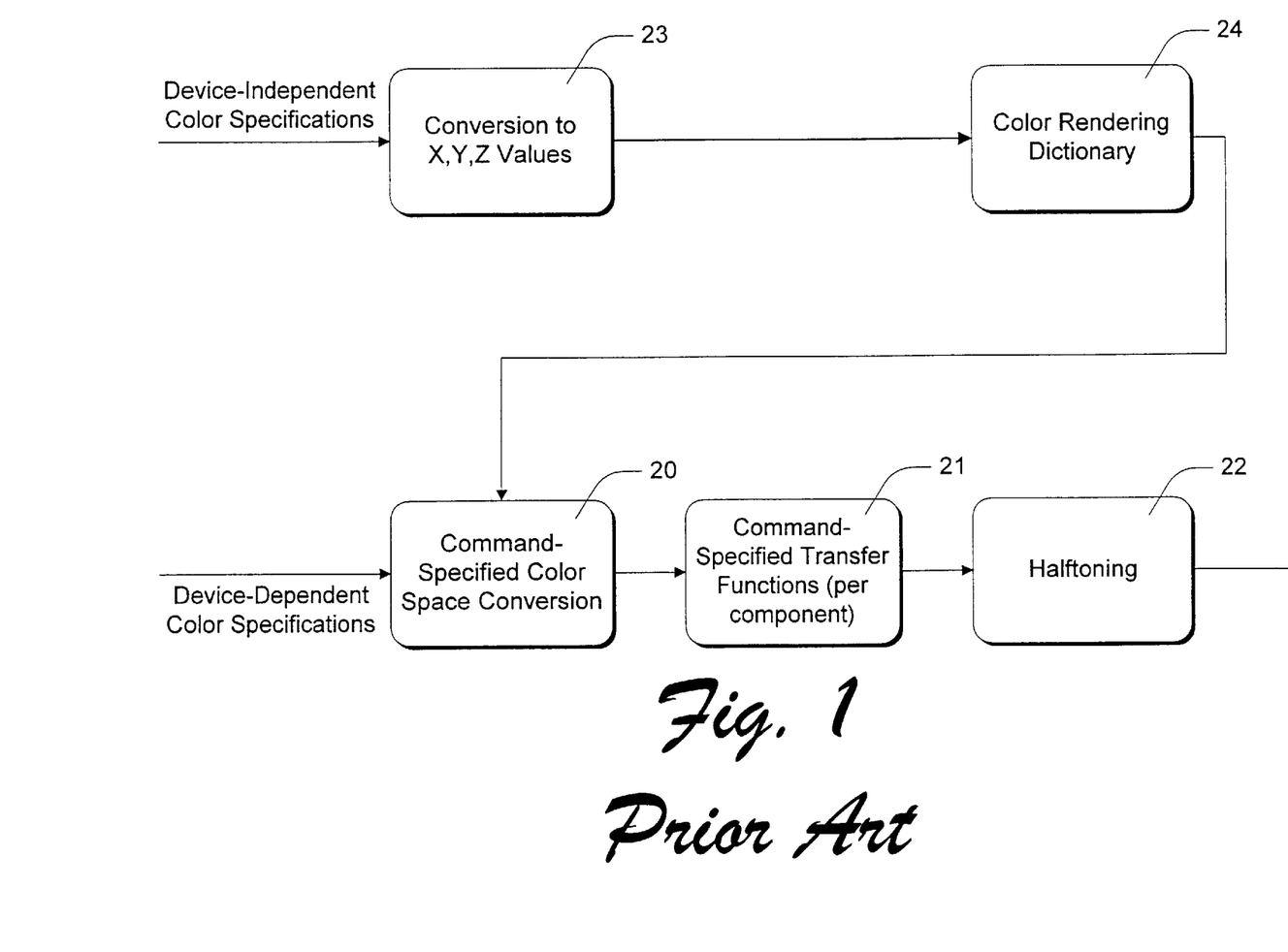
FIG. 1 is a block diagram of color rendering paths in a first example of a prior art PostScript language interpreter.

FIG. 1 shows major PostScript language features or operations, implemented by a software-based PostScript interpreter, for rendering color. The organization of FIG. 1 is defined by the PostScript standard, and is published in the *PostScript Language Reference Manual* (referenced above). Although the representation of FIG. 1 is somewhat simplified, it shows the standardized components that are relevant to the invention.

Colors can be specified in device-dependent or device-independent color spaces. A color specified in a device-dependent color space is referred to in FIG. 1 as a device-dependent color specification. A color specified in a device-independent color space is referred to in FIG. 1 as a device-independent color specification.

Device-dependent color specifications are processed first by a color conversion function 20. A PostScript language program can contain commands that request explicit conversions between device-dependent color spaces. Any such requested conversions are performed by color conversion function 20.

The interpreter then maps the device color values through transfer functions 21—one transfer function per color component. The transfer functions compensate for peculiarities of the output device, such as non-linear gray-level response. This step is sometimes called gamma correction.

If the output device cannot reproduce continuous tones, but only certain discrete colors, such as black and white pixels, the interpreter invokes a halftone function 22, which approximates the desired colors by means of patterns of pixels.

Finally, the interpreter performs scan conversion (not shown) to paint the appropriate pixels of the raster output device with the requested colors.

Device-independent color specifications are processed first by a CIE conversion function 23, and then by a color rendering dictionary 24. The CIE conversion function 23 converts device-independent color specifications to a base device-independent color space that uses components referred to as X, Y, and Z. Color rendering dictionary 24, in turn, transforms the device-independent color specifications into device-dependent color specifications. Specifically, the color rendering dictionary converts the device-independent color specifications to a native device-dependent color space—taking into account the known properties of the output device. The goal of this process is to produce actual visual output that accurately reproduces the requested device-independent color values as perceived by a human observer on the final rendering medium.

The color rendering dictionary is a standardized component of a PostScript language interpreter. However, its specific parameters are device dependent and are determined during a calibration process that is not specified by the PostScript standard. The color rendering dictionary can be configured to reference a three-dimensional lookup table to find device-dependent values corresponding to specified device-independent values. Furthermore, PostScript language commands can alter or configure the color rendering dictionary—although this is inadvisable in most situations.

The configuration shown in FIG. 1 is implemented in what is referred to as "Level 2" of the PostScript language standard. The previous version of the standard, referred to as "Level 1," did not include the concept of device independent color spaces. Accordingly, it did not include components 23 and 24 of FIG. 1, which relate to converting device-independent color specifications to device-dependent color specifications. Because of the differences between Level 1 and Level 2 of the PostScript language standard, the color processing path for device-dependent color specifications is referred to as the "Level 1 color pipeline." The color processing path for device-independent color specifications is referred to as the "Level 2 color pipeline."

The color rendering dictionary of the Level 2 pipeline was an important and necessary addition, in that it allowed a printer manufacturer to adjust color specifications in complex ways to account for peculiarities of the particular printing mechanism being used. Level 2 of the PostScript standard allowed more than one color rendering dictionary. As an extension to the standard, Hewlett-Packard Company implemented a feature referred to as "Colorsmart," which activated different color rendering dictionaries depending on the type of object being rendered. For example, text would receive different a color treatment than graphics or images. This significantly improved a printer's ability to accurately render colors.

Figure 2:
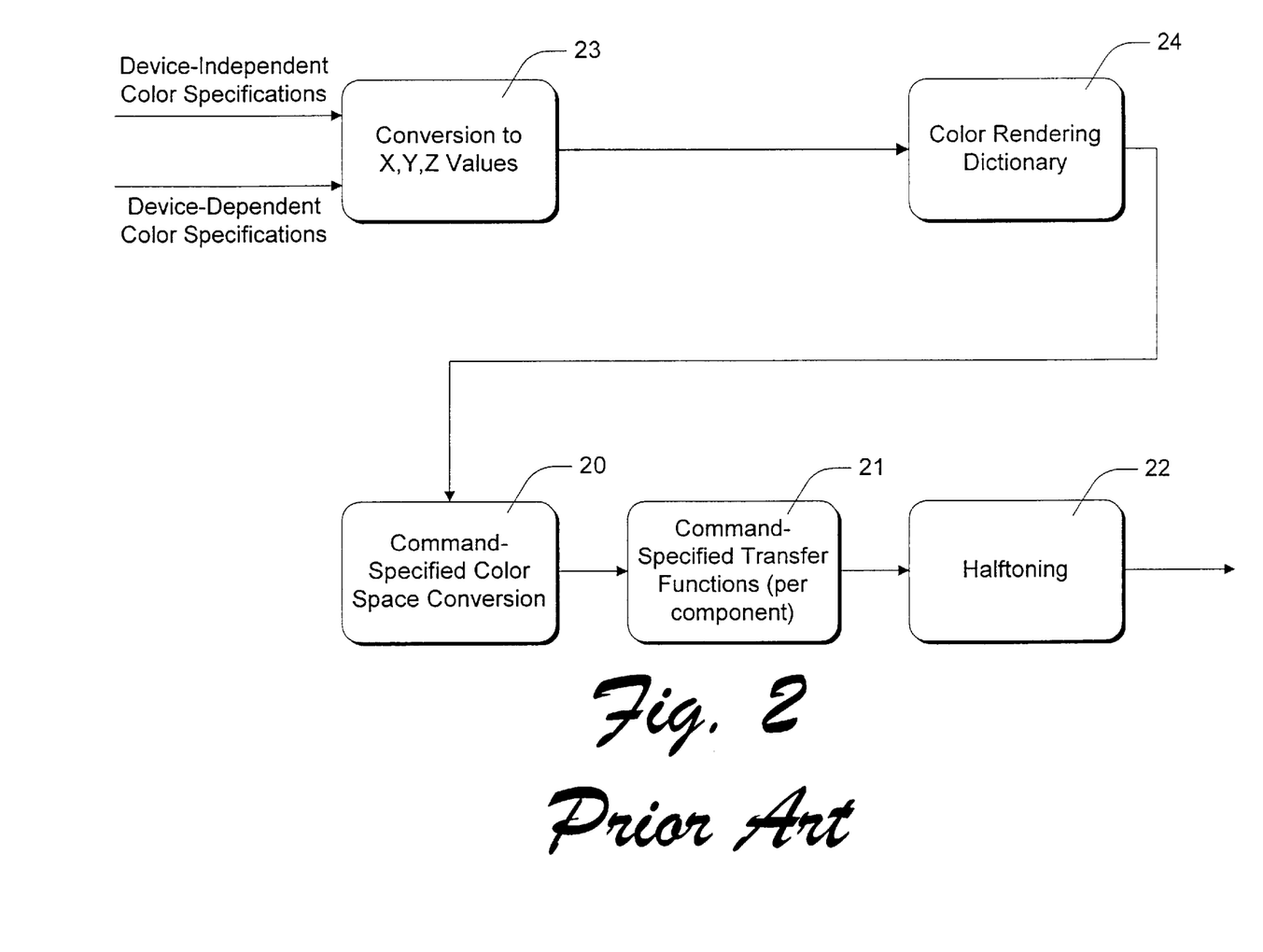
FIG. 2 is a block diagram of color rendering paths in a second example of a prior art PostScript language interpreter.

A significant shortcoming of the Level 2 PostScript standard was that the color rendering dictionary was not available in the Level 1 path. In practice, however, many Level 2 interpreters have been implemented as shown in FIG. 2. The implementation of FIG. 2 includes the same general functions as that of FIG. 1. However, device-dependent color specifications are fed initially through the Level 2 pipeline. Conversion function 23 is expanded to convert device-dependent color specifications to the base device-independent color space (X, Y, Z). These color specifications are then processed by the color rendering dictionary 24, the color conversion function 20, transfer functions 21, and halftoning functions 22, in that order. In effect, both color-dependent and color-independent specifications are processed through the same pipeline. This allows the benefits of the color rendering dictionary to be obtained even when using device dependent color spaces.

While this is a workable solution, it has a significant shortcoming: implementing the color rendering dictionary adds significantly to the computing burden when processing device-dependent color specifications. Unfortunately, the standardized color rendering dictionary must be implemented in a very inefficient way due to the constraints imposed by the PostScript standard. The PostScript standard requires that the color rendering dictionary be configurable by PostScript programs. To provide such configurability, the color rendering dictionary uses bulky and inefficient data structures, containing large amounts of ASCII data. It is difficult or impossible to enhance the efficiency of these data structures without sacrificing compatibility with the PostScript standard.

Indeed, absolute compatibility with the PostScript standard is a very important requirement. One reason for the popularity of the PostScript language is that any PostScript program can be executed by any PostScript-compatible rendering device, and will result in nearly identical results. Printer manufacturers, as a result, have been very hesitant to alter the structure of the color rendering paths in any way.

Nevertheless, the prior art method of rendering device-dependent color specifications is significantly slower than it should be, due primarily to the fact that such color specifications are forced to traverse the Level 2 pipeline, including its relatively inefficient color rendering dictionary. The inventors have found a way to remedy this problem.

SUMMARY

The invention allows device-dependent color specifications to bypass the Level 2 pipeline in a PostScript printer or language interpreter, while still providing color calibration relative to the internal working color space of the printer. Specifically, device-dependent color specifications are operated on by a color correction component to convert the color specifications into the internal working color space of the printer just prior to the standard Level 1 transfer functions. The color correction component is implemented as a hardware-based set of numerical lookup tables that are much more efficient than the Level 2 color rendering dictionary. Device-dependent color specifications never enter the Level 2 pipeline.

Device-independent color specifications, on the other hand, follow their normal course through the Level 2 pipeline, including the color rendering dictionary. From there, the converted color specifications are supplied to the Level 1 color correction component, which adjusts the values and converts them into the internal working color space of the printer.

DETAILED DESCRIPTION

Figure 3:
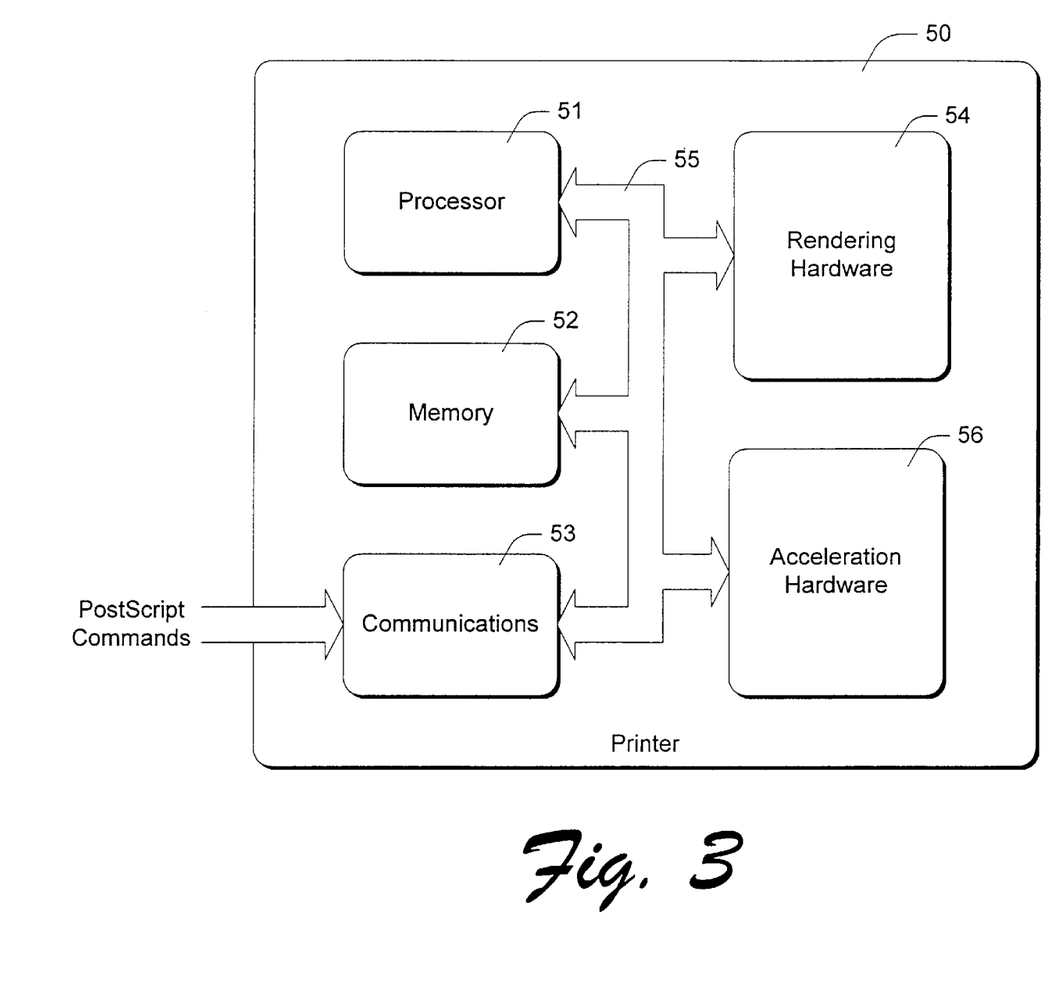
FIG. 3 is a simplified block diagram of a PostScript-compatible printer in accordance with the invention.

FIG. 3 shows pertinent components of a PostScript-compatible printer 50 in accordance with the invention. As used herein, the term PostScript-compatible means that the printer complies with PostScript specifications and standards published by Adobe Systems or standards bodies. A PostScript-compatible printer accepts valid PostScript programs and commands, and yields graphical output as specified by PostScript standards.

Printer 50 has a microprocessor 51 and associated memory 52. Memory 52 contains processor instructions that are executable by microprocessor 51 to perform desired steps and operations. In the described embodiment of the invention, such programmed steps and operations implement a PostScript-compatible interpreter including color rendering paths as described below. Standard programming techniques are used to compile instructions and programs that are sequentially executed by microprocessor 51 to carry out the functions of the interpreter. The microprocessor, memory, and instructions that implement the PostScript interpreter are commonly referred to as firmware.

Printer 50 also includes communications means 53 for receiving PostScript commands and programs from an external source such as a computer. Communications means 53 is typically a conventional parallel, serial, or network communications port. In many cases, bi-directional communications will be provided.

Printer 50 also includes rendering hardware 54. The specific nature of the rendering hardware depends on the exact nature of the printing process utilized by the printer. In the described embodiment of the invention, the printer utilizes color laser printing technology. The rendering hardware includes appropriate electrical and communications interfaces so that processor 51 can control the printing process. Communication between the various components of the printer is represented by a communications bus 55, although actual implementation might require different forms of interfaces between different components.

In addition to conventional components described above, printer 50 includes conversion acceleration hardware 56. Such hardware communications with microprocessor 51 through communications bus 55. The basic function of hardware 56 is to convert color specifications to internal working color specifications while accounting for specific characteristics of the printer. Thus, hardware 56 performs much of the job previously performed by the software-based color rendering dictionary of the standard Level-2 pipeline.

Acceleration hardware 56 can be implemented in a variety of ways. However, a preferable implementation is described in a United States Patent Application by Gary L. Vondran, Jr., having Ser. No. 08/691,608, filed on Aug. 2, 1996, and entitled "Apparatus for Generating Interpolator Input Data." An additional feature of this implementation is described in a second United States Patent Application by Gary L. Vondran, Jr., James R. Nottingham, and Douglass Heins. This second application, having Ser. No. 08/877,345, was filed Jun. 17, 1997, and is entitled "Multi-Path Data Processing Pipeline." Both of these previously-filed patent applications are hereby incorporated by reference.

Figure 4:
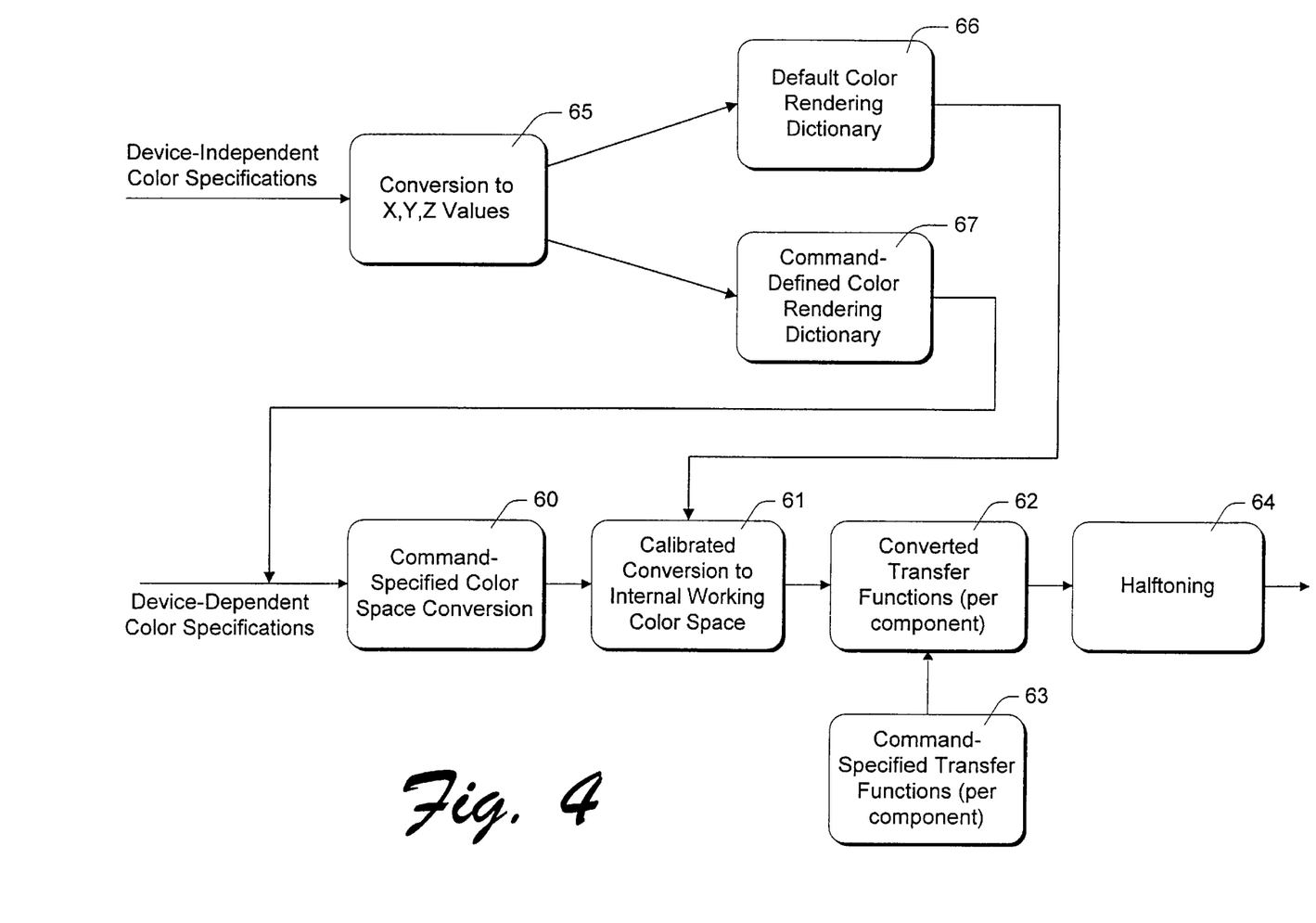
FIG. 4 is a block diagram of color rendering paths in a PostScript language interpreter in accordance with the invention.

FIG. 4 shows color rendering paths in accordance with an exemplary embodiment of the invention. The color rendering paths are formed within the PostScript language interpreter that is in turn implemented by processor 51 in conjunction with memory 52, the programs contained in memory 52, and acceleration hardware 56.

As those familiar with this technology will realize, the color rendering paths shown in FIG. 4 represent only a small portion of the functions and responsibilities of an actual PostScript interpreter. However, FIG. 4 illustrates the interpreter functions with which the present invention is concerned, relating to the conversion of command-specified color specifications to internal working color specifications.

The standardized PostScript graphics language interpreter implemented by printer 51 accepts both device-dependent and device-independent color specifications, in accordance with conventional PostScript Level 2 interpreter specifications. The nature of these different types of color specifications is described above, in the "Background" section of this document.

The function of the color rendering paths is to convert device-dependent and device-independent color specifications into internal working color specifications. The internal working color specifications are relative to an internal working color space that is specific to the actual rendering hardware of printer 50. Although the various blocks of FIG. 4 might imply discrete components for performing different functions, such blocks actually indicate different operations performed by the printer firmware, except for block 61 which indicates a function performed by acceleration hardware 56 in conjunction with the printer firmware.

The color conversion method illustrated by FIG. 4 includes two color rendering pipelines, corresponding to conventional PostScript Level 1 and Level 2 color rendering pipelines. The Level 1 pipeline accepts device-dependent color specifications, while the Level 2 pipeline accepts device-independent color specifications. Each pipeline is fully compatible with conventional PostScript color specifications.

The Level 1 pipeline is illustrated along the bottom portion of FIG. 4, beginning with a command-specified color space conversion function 60 that is optionally applied to incoming device-dependent color specifications. As described above, PostScript language programs can contain commands that request explicit conversions between device-dependent color spaces. Any such requested conversions are performed by color conversion function 60. Function 60 is a standard PostScript feature.

After the color space conversion of block 60, the device-dependent color specifications are converted to internal color specifications using acceleration hardware 56. Acceleration hardware 56 implements a calibrated n-dimensional operation in what will be referred to as a color correction component 61. The value n is greater than 1.

In the exemplary embodiment, the internal working color space is the CMY color space. Thus, operation 61 converts color specifications from all other device-dependent color spaces to the CMY color space, and does so in a calibrated manner to account for actual color characteristics of rendering hardware 54. CMY color specifications are converted to the extent that adjustments are needed to account for the peculiarities of rendering hardware 54.

The color correction component 61 is not a standard PostScript feature, and is not shown or suggested by PostScript specifications or other documentation. Rather, operation 61 is a strictly internal conversion operation that can be implemented in a variety of different ways, free from the constraints of prescribed PostScript protocols and formats. In contrast to a conventional PostScript color rendering dictionary, component 61 can be implemented very efficiently in terms of both memory and speed. Particularly when implemented in hardware as described above, this component results in dramatic increases in speed as compared to performing similar conversions in the standard color rendering dictionary.

In the described embodiment of the invention, acceleration hardware 56 implements a set of alternative n-dimensional operations, a selected one of which is performed depending on the type of PostScript object being rendered. Specifically, different operations are performed depending on whether the object being rendered is text, graphics, or an image, and depending on which actual device-dependent color space was initially used (RGB, CMY, CMYK, or grayscale). Acceleration hardware 56 is controlled by microprocessor 51, which determines the exact operation used to perform the conversion.

Each of the alternative operations involves referencing an n-dimensional lookup table with the components of the original device-dependent color specification to find corresponding components that are specified relative to the internal working color space. The lookup tables are preferably smaller in each dimension than the allowed gamuts of the device-dependent color space components. In the exemplary embodiment, each lookup table has a size of seventeen values in each dimension of the color-dependent color space. Tetrahedral or tri-linear interpolation is used to find internal color space values for device-dependent color specifications falling between the index values of the lookup tables.

Three different types of lookup tables are required, and are selected depending on the number of dimensions in the color space of the incoming device-dependent color specification. Assuming that the internal working color space is 3-dimensional, RGB and CMY color spaces require 3-dimensional to 3-dimensional lookup tables. For the CMYK color space, a 4-dimensional to 3-dimensional lookup table is required. For the grayscale color space, a 1-dimensional to 3-dimensional lookup table is required.

Lookup tables, implemented in hardware, are significantly more efficient than the awkward color rendering dictionary previously implemented in PostScript Level 2 color rendering pipelines. The use of simple numeric lookup tables is one reason for the increased efficiency. Performing a lookup in such a table is very fast compared to the corresponding process in a PostScript color rendering dictionary. The use of interpolation is another significant improvement over the prior art, since this greatly reduces the memory required to store a lookup table. Implementing the conversion process in hardware is another significant reason for the improved performance over the prior art.

The lookup tables utilized by correction component 61 are configured specifically for the printer model in which the PostScript interpreter is being implemented, to yield printed colors that match those displayed, for instance, on a computer monitor. Halftoning is implemented in additional hardware not shown for printers requiring halftoning.

The internal color specifications resulting from color correction component 61 are then processed by transfer functions 62 on a component-by-component basis. By default, the transfer functions are unity functions. However, PostScript commands received by printer 50 can specify different transfer functions relative to any of the available device-dependent color spaces. The command-specified transfer functions are represented in FIG. 4 by block 63. Before these functions are used, they are converted for use within the internal working color space of printer 50. For instance, transfer functions specified in the RGB color space are inverted before using them in the CMY internal working color space of printer 50. The converted transfer functions are then applied to the individual components of the internal color specifications. As described above, these transfer functions operate individually and separately on each component of a color specification. They are not capable of performing n-dimensional conversions such as performed by operation 61.

A halftoning operation 64 is then optionally performed on the color specifications that have now been converted to the internal color working space. By default, halftoning is disabled in this part of the pipeline. However, a PostScript program can specify halftoning though standard PostScript commands. The color specifications are then processed by scan conversion components (not shown).

The Level 2 pipeline begins with a conversion function 65 that converts CIE-based or other device-independent color specifications to a base device-independent color space that uses components X, Y, and Z. These device-independent color specifications are then converted to device-dependent color specifications using a standard PostScript color rendering dictionary 66. In accordance with the invention, no attempt is made to correct or calibrate color values at this point. Rather, a direct and simple conversion is made into one of the device-dependent color spaces. The resulting device-dependent color specifications are then passed into the Level 1 pipeline for flirter processing. Specifically, they are passed directly into color correction component 61, implemented by conversion acceleration hardware 56, for calibrated conversion to the internal working color space.

In the case where a PostScript program specifies its own color rendering dictionary 67, such a dictionary is implemented along a separate path and the default color rendering dictionary 66 is bypassed. Converted color specifications of the command-specified color rendering dictionary 67 are passed back through conversion component 60 to convert them into different device-dependent color working space in response to PostScript commands.

Although the description above is phrased primarily in terms of the invention's operational and functional components, the invention also includes methodological steps of converting PostScript color specifications to the internal working color space of a printer. Such steps include implementing Level 1 and Level 2 pipelines for device-dependent and device-independent color specifications, respectively. The following steps are performed in the Level 1 pipeline:

Performing a command-specified color space conversion (block 60 of FIG. 4).

Converting device-dependent color specifications to internal color specifications using a hardware-based, calibrated, n-dimensional function of the color specification components, where n is greater than 1 (block 61 of FIG. 4). This step comprises operating on the device-dependent color specifications with conversion accelerator hardware. More specifically, it comprises referencing one of a plurality of n-dimensional lookup tables, and potentially interpolating between values of such a lookup table.

Applying transfer functions to components of the internal color specifications in response to graphics language commands that specify such transfer functions (block 62 of FIG. 4).

Applying an optional or command-specified halftone function to the internal color specifications after applying the transfer functions (block 64 of FIG. 4).

The following steps are performed in the Level 2 pipeline:

Performing a color space conversion between device-independent color spaces (block 65 of FIG. 4).

Converting the device-independent color specifications to device-dependent color specifications using a PostScript color rendering dictionary (block 66 of FIG. 4).

Passing the device dependent color specifications into the Level 1 pipeline for further processing, wherein such further processing includes the step of converting the device-dependent color specifications to internal color specifications.

The invention results in a significant improvement in the efficiency of processing device-dependent color specifications. Previously, such specifications were processed through the PostScript Level 2 pipeline, including the inefficient Level 2 color rendering dictionary. Now, the Level 2 pipeline has been bypassed. Color correction is performed by a color correction operation or component 61 that can be implemented very efficiently in hardware, without sacrificing PostScript compatibility. In addition, device-independent colors specified through Level 2 are eventually processed by the Level 1 color correction component, eliminating the need for inefficient color correction in the remaining Level 2 color rendering dictionary. In comparison to prior art PostScript printers, a printer implemented in accordance with the invention uses less memory, and uses less processing overhead to implement the respective color rendering pipelines.

The invention has been described in language specific to structural features and/or methodological steps. It is to be understood, however, that the invention defined in the appended claims is not necessarily limited to the specific features or steps described above. Rather, the specific features and steps are disclosed as exemplary forms of implementing the claimed invention.

We claim:

1. In a PostScript graphics language interpreter that accepts PostScript commands indicating both device-dependent and device-independent color specifications, wherein the graphics language interpreter converts the device-dependent and device independent color specifications to internal color specifications before rendering, a color conversion method comprising the following steps:

converting device-independent color specifications to device-dependent color specifications using a standard PostScript color rendering dictionary;

converting device-dependent color specifications, including those converted from the device-independent color specifications, to internal color specifications using a calibrated n-dimensional operation that is not a standard PostScript operation, where n is greater than 1.

2. A color conversion method as recited in claim 1, comprising the following additional steps:

receiving PostScript commands that specify transfer functions that are to be applied to components of the device-dependent color specifications, such transfer functions being standard PostScript operations;

converting the received transfer functions for use with the internal color specifications;

applying the converted transfer functions to components of the internal color specifications.

3. A color conversion method as recited in claim 1, wherein the step of converting device-dependent color specifications comprises referencing an n-dimensional lookup table.

4. A color conversion method as recited in claim 1, wherein the step of converting device-dependent color specifications comprises:

referencing an n-dimensional lookup table;

interpolating between values of the lookup table.

5. A color conversion method as recited in claim 1, wherein the step of converting device-dependent color specifications comprises operating on the device-dependent color specifications with conversion accelerator hardware.

6. In a graphics language interpreter that accepts commands indicating both device-dependent and device-independent color specifications, wherein the graphics language interpreter converts the device-dependent and device independent color specifications to internal color specifications before rendering, a color conversion method comprising the following steps:

implementing a first pipeline for device-dependent color specifications, wherein at least the following steps are performed in the first pipeline:

converting the device-dependent color specifications to internal color specifications using conversion acceleration hardware;

applying transfer functions to components of the internal color specifications in response to graphics language commands that specify such transfer functions;

implementing a second pipeline for device-independent color specifications, wherein the second pipeline performs steps comprising;

converting the device-independent color specifications to device-dependent color specifications using a color rendering dictionary;

passing such device-dependent color specifications into the first pipeline for further processing, wherein such further processing includes the step of converting the device-dependent color specifications to internal color specifications.

7. A color conversion method as recited in claim 6, further comprising the following additional step performed in the first pipeline:

applying a halftone function to the internal color specifications after applying the transfer functions.

8. A color conversion method as recited in claim 6, wherein the converting step performed in the first pipeline comprises referencing an n-dimensional lookup table in the conversion acceleration hardware.

9. A color conversion method as recited in claim 6, wherein the converting step performed in the first pipeline comprises:

referencing an n-dimensional lookup table in the conversion acceleration hardware;

interpolating between values of the lookup table in the conversion acceleration hardware.

10. A color conversion method as recited in claim 6, wherein the converting step performed in the first pipeline is an n-dimensional function of color specification components.

11. A color conversion method as recited in claim 6, wherein the converting step performed in the first pipeline comprises a set of alternative n-dimensional operations.

12. A color conversion method as recited in claim 6, wherein the converting step in the second pipeline is a standardized operation of a standardized graphics language interpreter, and the converting step in the first pipeline is not a standardized operation of the standardized graphics language interpreter.

13. A color conversion method as recited in claim 6, wherein:

the device-dependent color specifications are specified in one of the following color spaces: RGB; CMY; and Grayscale; and the device-independent color specifications are specified in CIE-based color spaces.

14. A PostScript-compatible printer that renders graphical objects in response to PostScript language commands indicating both device-dependent and device-independent color specifications, the printer comprising a processor, the processor being configured to perform steps comprising:

in a first color rendering pipeline, converting device-dependent color specifications to internal color specifications using a calibrated n-dimensional operation, where n is greater than 1;

in a second color rendering pipeline, converting device-independent color specifications to device-dependent color specifications using a standard PostScript color rendering dictionary and then passing such device-dependent color specifications into the first pipeline for further processing.

15. A printer as recited in claim 14, the processor being configured to perform additional steps in the first color rendering pipeline, comprising:

receiving transfer functions that are to be applied individually to respective components of the device-dependent color specifications;

converting the received transfer functions for use with the internal color specifications;

applying the converted transfer functions to the respective components of the internal color specifications.

16. A printer as recited in claim 14, further comprising conversion acceleration hardware, wherein the converting step performed in the first color rendering pipeline comprises operating on the device-dependent color specifications with the conversion accelerator hardware.

17. A printer as recited in claim 14, further comprising conversion acceleration hardware, wherein the converting step performed in the first color rendering pipeline comprises:

referencing an n-dimensional lookup table in the conversion acceleration hardware;

interpolating between values of the lookup table in the conversion acceleration hardware.

18. A printer as recited in claim 14, further comprising conversion acceleration hardware, wherein the converting step performed in the first color rendering pipeline is an n-dimensional function of color specification components performed in the conversion acceleration hardware.

19. A printer as recited in claim 14, further comprising conversion acceleration hardware, wherein the converting step performed in the first color rendering pipeline comprises a set of alternative n-dimensional operations performed in the conversion acceleration hardware.

\* \* \* \* \*